United States Patent [19]

Deep et al.

[11] Patent Number: 4,884,163
[45] Date of Patent: Nov. 28, 1989

[54] CONDUCTIVE POLYMER DEVICES

[75] Inventors: Marguerite E. Deep, Los Altos; Nelson H. Thein, Fremont, both of Calif.

[73] Assignee: Raychem Corporation, Menlo Park, Calif.

[21] Appl. No.: 177,720

[22] Filed: Apr. 5, 1988

Related U.S. Application Data

[62] Division of Ser. No. 711,909, Mar. 14, 1985, Pat. No. 4,774,024.

[51] Int. Cl.⁴ .............................................. H02H 5/04
[52] U.S. Cl. .................................... 361/58; 361/106; 338/22 R; 219/505
[58] Field of Search ................... 361/56, 58, 103, 106, 361/111; 338/22 R, 225 D; 219/504, 505, 510

[56] References Cited

U.S. PATENT DOCUMENTS

| | | | |
|---|---|---|---|
| 4,113,691 | 9/1978 | Ward | 260/37 |
| 4,237,441 | 12/1980 | van Konynenburg et al. | 338/22 R |
| 4,238,812 | 12/1980 | Middleman et al. | 361/106 |
| 4,255,698 | 3/1981 | Simon | 320/35 |
| 4,315,237 | 2/1982 | Middleman et al. | 338/22 R |
| 4,317,027 | 2/1982 | Middleman et al. | 219/553 |
| 4,329,726 | 5/1982 | Middleman et al. | 361/58 |
| 4,352,083 | 9/1982 | Middleman et al. | 338/23 |
| 4,397,983 | 8/1983 | Hill et al. | 524/790 |
| 4,413,301 | 11/1983 | Middleman et al. | 361/106 |
| 4,450,496 | 5/1984 | Doljack et al. | 361/58 |
| 4,475,138 | 10/1984 | Middleman et al. | 361/58 |
| 4,481,498 | 11/1984 | McTavish et al. | 338/20 |
| 4,542,365 | 9/1985 | McTavish et al. | 338/20 |
| 4,549,161 | 10/1985 | McTavish et al. | 338/20 |
| 4,562,313 | 12/1985 | Tomlinson et al. | 179/175 |
| 4,647,894 | 3/1987 | Ratell | 338/22 R |
| 4,647,896 | 3/1987 | Ratell | 338/22 R |
| 4,685,025 | 8/1987 | Carlomagno | 361/106 |
| 4,724,417 | 2/1988 | Au et al. | 338/22 R |

FOREIGN PATENT DOCUMENTS

| | | |
|---|---|---|
| 038713 | 10/1981 | European Pat. Off. |
| 158410 | 10/1985 | European Pat. Off. |
| 1185473 | 3/1970 | United Kingdom |
| 2074170 | 10/1981 | United Kingdom |

OTHER PUBLICATIONS

Union Carbide: Organosilicon Chemicals Product Application Information, 1984.
Solem Industries: Hydrated Alumina Product Information.
Monte et al., "The Use of Titanate Coupling Agents in Conductive Composites", Rubber World, Apr., 1984, pp. 20–34.

Primary Examiner—Todd E. Deboer
Attorney, Agent, or Firm—Marguerite E. Gerstner; Timothy H. P. Richardson; Herbert G. Burkard

[57] ABSTRACT

Conductive polymer compositions, particularly PTC compositions, which contain alumina trihydrate, or another arc-controlling agent, and a lubricant or coupling agent. Advantages which can result from use of the lubricant or coupling agent include improved PTC behavior and improved adhesion to metal conductors, in particular metal foils and solid metal wires.

7 Claims, 1 Drawing Sheet

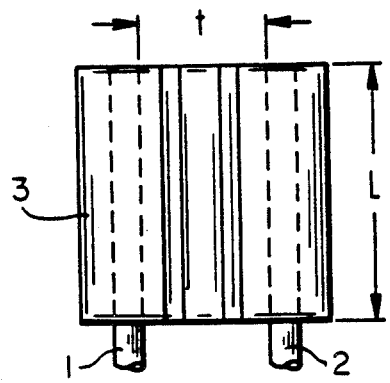
FIG_1
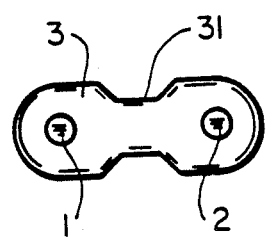
FIG_2

CONDUCTIVE POLYMER DEVICES

CROSS REFERENCE TO RELATED APPLICATIONS

This application is a divisional of copending application Ser. No. 711,909, filed on Mar. 14, 1985 now U.S. Pat. No. 4,774,024, the entire disclosure of which is incorporated by reference herein.

BACKGROUND OF THE INVENTION

1. Field of the Invention

This invention relates to conductive polymer compositions.

2. Introduction to the Invention

Conductive polymer compositions exhibiting PTC behavior, and electrical devices comprising them, are well known. Reference may be made, for example, to U.S. Pat. Nos. 2,952,761; 2,978,665; 3,243,753; 3,351,882; 3,571,777; 3,757,086; 3,793,716; 3,823,217; 3,858,144; 3,861,029; 3,950,604; 4,017,715; 4,072,848; 4,085,286; 4,117,312; 4,177,376; 4,177,446; 4,188,276; 4,237,441; 4,242,573; 4,246,468; 4,250,400; 4,252,692; 4,255,698; 4,271,350; 4,272,471; 4,304,987; 4,309,596; 4,309,597; 4,314,230; 4,314,231; 4,315,237; 4,317,027; 4,318,881; 4,327,351; 4,330,704; 4,334,351; 4,352,083; 4,388,607; 4,398,084; 4,413,301; 4,425,397; 4,426,339; 4,426,633; 4,427,877; 4,435,639; 4,429,216; and 4,442,139; J. Applied Polymer Science 19, 813–815 (1975), Klason and Kubat; Polymer Engineering and Science 18, 649–653 (1978), Narkis et al; and commonly assigned U.S. Ser. Nos. 601,424 now abandoned, published as German OLS No. 1,634,999; 732,792 (Van Konynenburg et al), now abandoned, published as German OLS No. 2,746,602; 798,154 (Horsma et al), now abandoned, published as German OLS No. 2,821,799; 134,354 Lutz) now abandoned; 141,984 (Gotcher et al) now abandoned, published as European Application No. 38,718; 141,988 (Fouts et al), now abandoned, published as European Application No. 38,718, 141,989 (Evans), published as European Application No. 38,713, 141,991 (Fouts et al), now U.S. Pat. No. 4,545,926, published as European Application No. 38,714, 150,909 (Sopory), now abandoned published as UK Application No. 2,076,106A, 184,647 (Lutz), 250,491 (Jacobs et al) and 254,352 (Taylor), now U.S. Pat. No. 4,426,633, published as European Application No. 63,440, 272,854 and 403,203 (Stewart et al), U.S. Pat. No. 4,502,929, published as European Patent Application No. 67,679, 274,010 (Walty et al), now abandoned 300,709 and 423,589 (Van Konynenburg et al), published as European Application No. 74,281, 349,505 (McTavish et al), now U.S. Pat. No. 4,481,498, published as European Application No. 87,884, 369,309 (Midgley et al), now abandoned, published as European Application No. 92,406, 380,400 (Kamath), now U.S. Pat. No. 4,459,473, published as European Application No. 96,492, 474,390 (Leary), now U.S. Pat. No. 4,589,866, 483,633 (Wasley), now abandoned, published as European Application No. 123,540, 485,572 (Nayak et al), now U.S. Pat. No. 4,473,450, 493,445 (Chazan et al), now U.S. Pat. No. 4,517,449, 493,390 (Leary et al), now abandoned 509,897 (Masia et al), now abandoned, published as European Application No. 133,748, 524,482 (Tomlinson et al), now U.S. Pat. No. 4,562,313, 534,913 (McKinley), now abandoned, 535,449 (Cheng et al) now U.S. Pat. No. 4,514,620, 552,649 (Jensen et al), now abandoned, published as European Application No. 144,187, 573,099 (Batliwalla et al) and 904,736, (Penneck et al) published as UK Pat. Nos. 1,470,502 and 1,470,503, 628,945 (Carlomagno), now abandoned and 650,918, 650,920 and 650,919 (Batliwalla et al) (MPO959, 961 and 962) abandoned, published as European Application Nos. 158,410, 175,550, and 176,284. The disclosure of each of the patents, publications and applications referred to above is incorporated herein by reference.

Particularly useful devices comprising PTC conductive polymers are circuit protection devices. Such devices have a relatively low resistance under the normal operating conditions of the circuit, but are "tripped", i.e., converted into a high resistance state, when a fault condition, e.g., excessive current or temperature, occurs. When the device is tripped by excessive current, the current passing through the PTC element causes it to self-heat to an elevated temperature at which it is in a high resistance state. The increase in resistance is accompanied by an expansion of the PTC element along an expansion axis. Such devices, and PTC conductive polymer compositions for use in them, are described for example in U.S. Pat. Nos. 4,237,411, 4,238,812; 4,255,698; 4,315,237; 4,317,027; 4,329,726; 4,352,083; 4,413,301; 4,450,496; 4,475,138; 4,481,498 4,562,313; 4,647,896; 4,647,897; 4,685,025; and 4,724,417 and in copending commonly assigned U.S. application Ser. Nos. 141,989 (MP0715), published as European Application Ser. Nos. 38,713 and 628,945 (MP.906), now abandoned, published as European Application No. 158,410. The disclosure of each of these patents and pending applications is incorporated herein by reference. Ser. No. 141,989, which has been published as European Application No. 38,713, discloses that the addition of an arc-controlling additive such as alumina trihydrate to a conductive polymer results in improved performance under electrical stress and that compositions containing such additives are, therefore, particularly useful for circuit protection devices.

SUMMARY OF THE INVENTION

We have now discovered that yet further advantages can be obtained by employing a lubricant or coupling agent in conjunction with an arc-controlling agent in conductive polymer compositions. The lubricant or coupling agent can be pre-coated onto the arc-controlling agent before it is mixed with the polymeric component and the carbon black (or other conductive filler), or it can be added as a separate ingredient. We have found that advantages which can result from use of the lubricant or coupling agent include improved adhesion to metal conductors, in particular metal foils and solid metal wires, and, in the case of PTC compositions, a higher ratio of resistivity at temperatures above the melting point to room temperature resistivity. Other advantages include reduced melt viscosity and/or the ability to increase the total concentration of particulate fillers. The valuable results of using a lubricant or coupling agent are particularly surprising in that it would be expected that the lubricant or coupling agent would migrate to the surface of the composition and cause contact resistance problems.

Accordingly, in its first aspect, this invention provides a conductive polymer composition, particularly one exhibiting PTC behavior, which comprises (1) a polymeric component;
(2) a particulate conductive filler component which is dispersed in the polymeric component;

(3) an arc-controlling agent; and
(4) a lubricant or coupling agent for the arc-controlling agent.

In its second aspect, the invention provides an electrical device, particularly a circuit protection device, which comprises two electrodes and a PTC element which is composed of a composition as defined above.

BRIEF DESCRIPTION OF THE DRAWING

The invention is illustrated in the accompanying drawing in which

FIGS. 1 and 2 are front and cross-sectional views, respectively, of a circuit protection device of the invention.

DETAILED DESCRIPTION OF THE INVENTION

Lubricants and coupling agents for filled polymeric compositions (for example stearates and other long chain fatty acid metal salts and esters, titanates, and silanes and other organo-silicon compounds) and pre-coated alumina trihydrates (e.g. stearate-coated and silane-coated alumina trihydrates), suitable for use in this invention, are well known; reference may be made for example to Plastics Compounding, March/April 1982, pages 35, 36 and 38, March/April 1983, pages 71, 72, 74, 76, 78 and 81, and March/April 1984, pages 61–64 and 66; Handbook of Fillers and Reinforcements for Plastics (1978, edited by Milewski), pages 59–61 and 237–432; the Encyclopedia of Basic Materials for Plastics (1967, edited by Simonds and Church), Pages 29 and 30; and the product brochures available from Union Carbide Corp., Kenrich Petrochemicals Inc. and Solem Industries Inc. Only a small amount of lubricant or coupling agent is needed in order to obtain the desired results, especially when it is pre-coated onto the arc-controlling agent, the amount then used preferably being sufficient to provide a layer which is at least one molecule thick e.g. 2 to 5 molecules thick, over the whole of the surface area of the arc-controlling additive. When the lubricant or coupling agent is added separately, the amount employed is preferably at least 0.5% by volume, e.g. 0.75 to 3% by volume. It is usually preferred to use ionic compounds, e.g. calcium stearate, or another salt of a long chain fatty acid, as lubricants since they have a lesser tendency to migrate to the interface between the composition and the electrode.

Suitable arc-controlling agents include particulate materials which, when heated in the absence of air, will decompose to give a gaseous by-product, e.g. one or more of $H_2O$, $CO_2$ and $N_2$, particularly a hydrated metal oxide or other hydrated inorganic material, especially alumina trihydrate. The amount of the arc-controlling agent is preferably 7 to 25%, particularly 8 to 20%, by volume of the composition.

The particulate conductive filler in the compositions preferably comprises carbon black, alone or together with graphite or another conductive filler. The carbon black and the amount thereof are preferably selected with a view to the desired resistivity/temperature characteristics of the composition, as taught, for example, by the documents incorporated herein by reference. Thus for the low resistivity (less than 100 ohm.cm, preferably less than 50 ohm.cm, particularly less than 10 ohm.cm at 23° C.) PTC compositions which are preferred in this invention, the carbon black preferably has a particle size, D, which is from 20 to 150 millimicrons and a surface area, S, in $m^2/g$ which is such that S/D is not more than 10. When using such a carbon black, preferably the quantity $$\frac{S}{D} \times \frac{(\text{vol. of carbon black} + \text{vol. of arc-controlling agent})}{\text{volume of polymer}}$$

is less than 1.

The composition can also contain a non-conductive particulate filler, and/or other components which help to provide desired physical and/or electrical properties.

The polymer component, which can comprise one or more polymers, is preferably also selected with a view to the desired temperature/resistivity and other characteristics of the composition, as taught by the documents incorporated herein by reference. Thus for PTC compositions, the polymer preferably has a crystallinity (measured by DSC) of at least 30%, particularly at least 50%, with higher values, e.g. at least 60%, being preferred. Suitable crystalline polymers include polymers of one or more olefins, particularly polyethylene; copolymers of at least one olefin and at least one monomer copolymerisable therewith; melt-shapeable fluoropolymers; and blends of two or more such crystalline polymers. The polymer component can also contain a minor proportion, preferably less than 15% by volume, of an elastomer.

The novel compositions can be shaped by melt extrusion or, in many cases, by injection molding thanks to the reduced melt viscosity resulting from the presence of the lubricant or coupling agent.

The shaped articles of the novel compositions can be (and for use in circuit protection devices preferably are) cross-linked, preferably by radiation.

Circuit protection devices of the invention preferably comprise a pair of columnar electrodes embedded in the conductive polymer and have a resistance of less than 100 ohms, preferably less than 50 ohms.

Referring now to the drawing, FIGS. 1 and 2 show face and side views of a circuit protection device comprising columnar electrodes 1 and 2 embedded in, and in physical contact with, a PTC conductive polymer element 3 which has a central section of reduced cross-section by reason of restriction 31. The height of the PTC element is L and the distance between the electrodes is t.

The invention is illustrated in the following Examples.

EXAMPLES

Conductive polymer compositions were prepared by mixing together the ingredients and amounts thereof (in parts by volume) shown in the Table below. The ingredients were carefully dried, dry-blended, melt-blended in a Banbury mixer, dumped onto a two-roll mill, and granulated. The granules were melt-pressed into slabs, and the properties shown in the Table below were measured. Examples 1 and 4 are comparative Examples. The various ingredients and test results shown in the Table are further identified below.

HDPE is a high density polyethylene with a melt index of 0.3 sold by Phillips Petroleum co. under the trade name Marlex 6003.

Furnex N 765 is a carbon black sold by Columbian Chemicals.

Statex G is a carbon black sold by Columbian Chemicals.

Sterling SO is a carbon black sold by Cabot Corporation.

Al$_2$O$_3$.3H$_2$O is alumina trihydrate sold by Alcoa under the trade name Hydral 705.

Si-coated Al$_2$O$_3$.3H$_2$O(1) is a silane-coated alumina trihydrate having a particle size of 3-4 microns sold by J. M. Huber under the trade name Solem 632SP.

Si-coated Al$_2$O$_3$.3H$_2$O(2) is a silane-coated alumina trihydrate having a particle size of about 0.8 microns sold by J. M. Huber under the trade name Solem 916SP.

Stearate-coated Al$_2$O$_3$.3H$_2$O is a stearate-coated alumina trihydrate sold by J. M. Huber under the trade name Solem 700SL.

Antioxidant was an oligomer of 4,4-thio bis(3-methyl 1-6-t-butyl phenol) with an average degree of polymerisation of 3-4, as described in U.S. Pat. No. 3,986,981.

$R_{23}$ is the resistivity of the melt-pressed composition in ohm.cm. at 23° C.

R ratio is the ratio of the resistivity of the composition at a temperature of 180° C. (about 50° C. above the melting point of Marlex 6003) to $R_{23}$.

Adhesion is the adhesion (in pounds per linear inch) of the composition to a nickel foil, as measured by the following procedure. A nickel foil is laminated to the melt-pressed slab under heat and pressure. A strip 1 inch wide by 6 inch long is cut from the laminate, and one end of the foil is peeled back a distance of 3.5 inch. In an Instron tester, the peeled foil is attached to the bottom clamp and the peeled polymer strip is attached to the top clamp. The weight (attached to the bottom clamp) and speed of the Instron are set to give 1 lb/1 inch on the reference chart; the chart and the Instron are turned on, thus peeling off the remainder of the foil. The adhesion is reported as the maximum point on the chart.

TABLE

| Example No. | 1(C) | 2 | 3 | 4(C) | 5 | 6 | 7 | 8 | 9 |
|---|---|---|---|---|---|---|---|---|---|
| INGREDIENTS | | | | | | | | | |
| HDPE | 54.3 | 53.7 | 53.7 | 54.0 | 54.0 | 50.3 | 54.0 | 51.6 | 55.1 |
| Furnex N 765 | — | — | — | 26.0 | 26.0 | 26.7 | 26.0 | — | — |
| Statex G | 27.6 | 27.1 | 31.1 | — | — | — | — | 33.9 | — |
| Sterling SO | — | — | — | — | — | — | — | — | 26.1 |
| Al$_2$O$_3$.3H$_2$O | 16.5 | 15.5 | — | 18.3 | — | — | — | — | — |
| Si-coated Al$_2$O$_3$.3H$_2$O(1) | — | — | 13.5 | — | — | — | 18.3 | 13.0 | — |
| Si-coated Al$_2$O$_3$.3H$_2$O(2) | — | — | — | — | 18.3 | — | — | — | — |
| Stearate-coated Al$_2$O$_3$.3H$_2$O | — | — | — | — | — | 21.3 | — | — | 16.5 |
| Calcium Stearate | — | 2.0 | — | — | — | — | — | — | — |
| Antioxidant | 1.6 | 1.6 | 1.6 | 1.7 | 1.7 | 1.7 | 1.7 | 1.5 | 1.7 |
| TESTS | | | | | | | | | |
| $R_{23}$ | 1.44 | 1.64 | 1.16 | 0.67 | 2.01 | 0.99 | 1.72 | 2.29 | 1.99 |
| R Ratio | $1.8 \times 10^5$ | $5.5 \times 10^4$ | $2.6 \times 10^5$ | $1 \times 10^4$ | $5.6 \times 10^7$ | $1.8 \times 10^5$ | $2.4 \times 10^5$ | $3.2 \times 10^6$ | $3.16 \times 10^5$ |
| Adhesion | 0.3 | — | 0.7 | 0.6 | 0.8 | — | — | — | — |

We claim:

1. An electrical device which comprises a metal electrode and a conductive polymer composition which is in direct physical and electrical contact with the electrode and which comprises
   (1) a polymeric component;
   (2) a particulate conductive filler component comprising carbon black which is dispersed in the polymeric component;
   (3) an arc-controlling agent which (i) comprises a particulate compound which, when heated in the absence of air, decomposes to give H$_2$O, CO$_2$, or N$_2$, and (ii) is present at 7 to 25% by volume of the composition; and
   (4) a lubricant or coupling agent for the arc-controlling agent, said lubricant or coupling agent comprising an organo-silicon compound, a stearate or a titanate which is (i) precoated onto the arc-controlling agent, and (ii) if the lubricant or coupling agent is not pre-coated onto the arc-controlling agent, the lubricant or coupling agent is present at at least 0.5% by volume of the composition.

2. A device according to claim 1 wherein the arc-controlling agent is alumina trihydrate.

3. A device according to claim 1 wherein the composition exhibits PTC behavior.

4. A device according to claim 3 which has a resistance at 23° C. of less than 50 ohms and wherein the composition has a resistivity at 23° C. of less than 100 ohm.cm.

5. A device according to claim 1 wherein the electrode is a metal foil or a solid metal wire.

6. A circuit protection device which has a resistance at 23° C. of less than 100 ohms and which comprises a PTC element and two metal electrodes which can be connected to a source of electrical power to cause current to pass through the PTC element, the PTC element being composed of a conductive polymer composition which exhibits PTC behavior, which has been cross-linked by radiation, which has a resistivity at 23° C. of less than 100 ohm.cm and which comprises
   (1) a crystalline polymeric component;
   (2) carbon black which is dispersed in the polymeric component;
   (3) alumina trihydrate; and
   (4) a lubricant or a coupling agent for the alumina trihydrate.

7. A device according to claim 6 wherein the composition comprises 8 to 20% by volume of silane-coated alumina trihydrate, or stearate-coated alumina trihydrate, or both.

* * * * *